United States Patent
Maeshima et al.

[11] Patent Number: 5,389,975
[45] Date of Patent: Feb. 14, 1995

[54] VIDEO ADDITIVE INFORMATION IDENTIFYING DEVICE WITH PLURAL INPUTS

[75] Inventors: Yasuhito Maeshima, Aichi; Masayuki Suematsu; Masahiro Nakano, both of Tokyo, all of Japan

[73] Assignee: Sony Corporation, Tokyo, Japan

[21] Appl. No.: 48,508

[22] Filed: Apr. 20, 1993

[30] Foreign Application Priority Data

May 29, 1992 [JP] Japan .................. 4-161864

[51] Int. Cl.⁶ .............. H04N 5/46; H04N 5/445; H04N 7/087
[52] U.S. Cl. .................. 348/556; 348/478
[58] Field of Search ........... 358/147, 146, 180, 181, 358/242; H04N 7/087, 5/445, 5/46; 348/473, 474, 476, 478, 465, 460, 445, 449, 555, 556, 558

[56] References Cited

U.S. PATENT DOCUMENTS

| | | | |
|---|---|---|---|
| 4,394,690 | 7/1983 | Kobayashi | 358/147 |
| 4,521,810 | 6/1985 | Nigborowicz | 358/181 |
| 4,864,405 | 9/1989 | Chambers | 348/556 |
| 5,122,885 | 6/1992 | Yoshioka | 358/310 |
| 5,146,331 | 9/1992 | Tsuchida | 348/558 |
| 5,162,903 | 11/1992 | Ogino | 358/181 |
| 5,223,936 | 6/1993 | Van Der Vourt | 358/242 |

FOREIGN PATENT DOCUMENTS

| | | | |
|---|---|---|---|
| 402992 | 12/1990 | European Pat. Off. | H04N 7/087 |
| 487092 | 5/1992 | European Pat. Off. | H04N 9/79 |
| 90679 | 4/1989 | Japan | H04N 5/46 |
| 152381 | 6/1990 | Japan | H04N 5/46 |
| 48587 | 3/1991 | Japan | H04N 5/46 |
| 238985 | 10/1991 | Japan | H04N 5/335 |

Primary Examiner—James J. Groody
Assistant Examiner—Chris Grant
Attorney, Agent, or Firm—Jay H. Maioli

[57] ABSTRACT

In a video additive information identifying device, one of plural video signal inputs each containing a video ID signal is inserted as video additive information on one line at a predetermined position within a vertical blanking period. The selected video signal input is subjected to a Y/C separation processing, and the video ID signal of the selected video signal is extracted from a Y-signal after separation to identify the content of the extracted video ID signal, that is, a frame mode. On the basis of the identification result, a display frame mode of a video display is controlled to be corrected.

4 Claims, 2 Drawing Sheets

VIDEO ADDITIVE INFORMATION IDENTIFYING DEVICE WITH PLURAL INPUTS

BACKGROUND OF THE INVENTION

1. Field of the Invention

This invention relates to a video additive information identifying device, and particularly to a device for identifying video additive information representing a frame mode of a video signal whose aspect ratio is converted.

2. Description of Related Art

Recently, a television receiver usable for a Hi-vision broadcasting of 16:9 aspect ratio has been practically used, and also practical use of video equipments which are suitable for a wide image of 16:9 aspect ratio has been promoted even in an NTSC system which is a conventional television system.

In addition, in those equipments which are connected to the above video equipments, equipments each adopting currently-used aspect ratio of 4:3 and other types of equipments adopting aspect ratio of 16:9 have been intermixingly used, and connected to monitor terminals of Hi-vision image receivers.

In these cases, an identification information on video information, that is, a video ID is required to enable a user to freely operate these equipments without inconvenience. In order to satisfy this requirement there has been utilized a method in which the identification information is inserted as a video additive information into a vertical blanking period of a video signal.

A Hi-vision signal, particularly, is converted to an NTSC signal using a MUSE-NTSC converter for example. In this case, the video additive information, that is, the video ID signal is inserted into the converted NTSC signal at its vertical blanking period because the Hi-vision signal has originally 16:9 aspect ratio.

FIG. 1 shows a signal waveform of an example of the video ID signal. In this video ID signal, a reference signal having 70IRE amplitude and 20-bit digital signal data having 70IRE or 0IRE amplitude are arranged at an effective video portion of one horizontal line, and an identification signal is coded and inserted to the 20-bit digital signal data. A clock frequency is set to $f_{sc}/8 \approx 447$ KHz, and 20th and 28th lines of the vertical blanking period are selected for transmission.

In a video display equipment for reproducing and displaying a video image from a video signal source having such video additive information, such as a television receiver, the video additive information is identified, and an optimum reproducing and displaying condition can be automatically set on the basis of the identification result.

In general, a video display equipment such as a television receiver has an input circuit which is usable for plural video signal sources. When a signal source having the information as described above is used as an input source, in a usual case a signal system for each video input is individually equipped with an identifying circuit for a video additive information, for example, a wide ID to make an identification.

According to the construction of the identifying circuit for the video additive information as described above, the input circuit for plural video signal sources requires plural video additive information identifying circuits which are suitable for the signal video signals, respectively. Therefore, the conventional device has a problem that the circuit construction is complicated, and the cost thereof is high.

SUMMARY OF THE INVENTION

An object of this invention is to provide a video additive information identifying device which is commonly usable for plural video signal inputs or sources.

In order to attain the above object, according to the video additive information identifying device of this invention, one video signal input is selected from plural video signal inputs in which video ID signals are inserted as video additive information to subject the selected video signal input to a Y/C separation processing, and then the video ID signal of the selected video signal input is extracted from the Y-signal after the separation, thereby making an identification.

The video ID signal is inserted on one line at a predetermined position of a vertical blanking period of a video signal.

Through this operation, the content of the video ID signal, that is, a frame mode is identified, and then a display frame mode of video display means is controlled to be corrected on the basis of the identification result.

The video ID signal is inserted on one line within a vertical blanking period, and its spectral component can be separated and extracted from a separated brightness signal because it is in a low-frequency band.

Therefore, if the circuit construction is so designed that the video ID signal is extracted from a Y signal after a separation processing, the device according to this invention can be commonly used for selected plural video signal inputs.

DETAILED DESCRIPTION OF THE DRAWINGS

Figure 1:
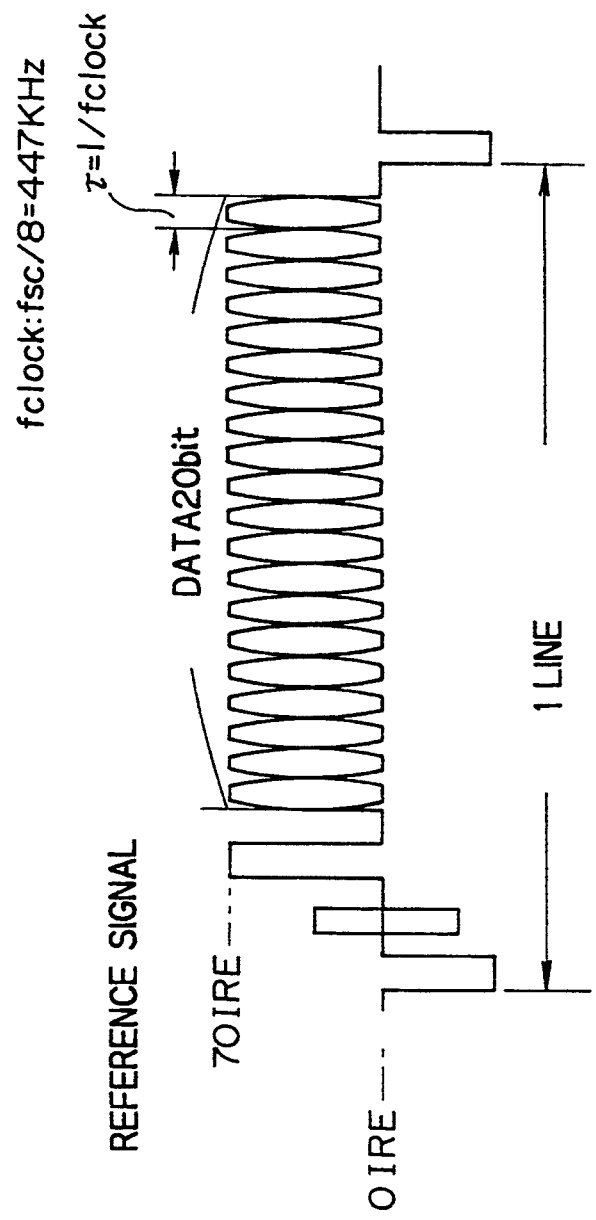
FIG. 1 is a waveform showing an example of a signal of a video ID signal.
Figure 2:
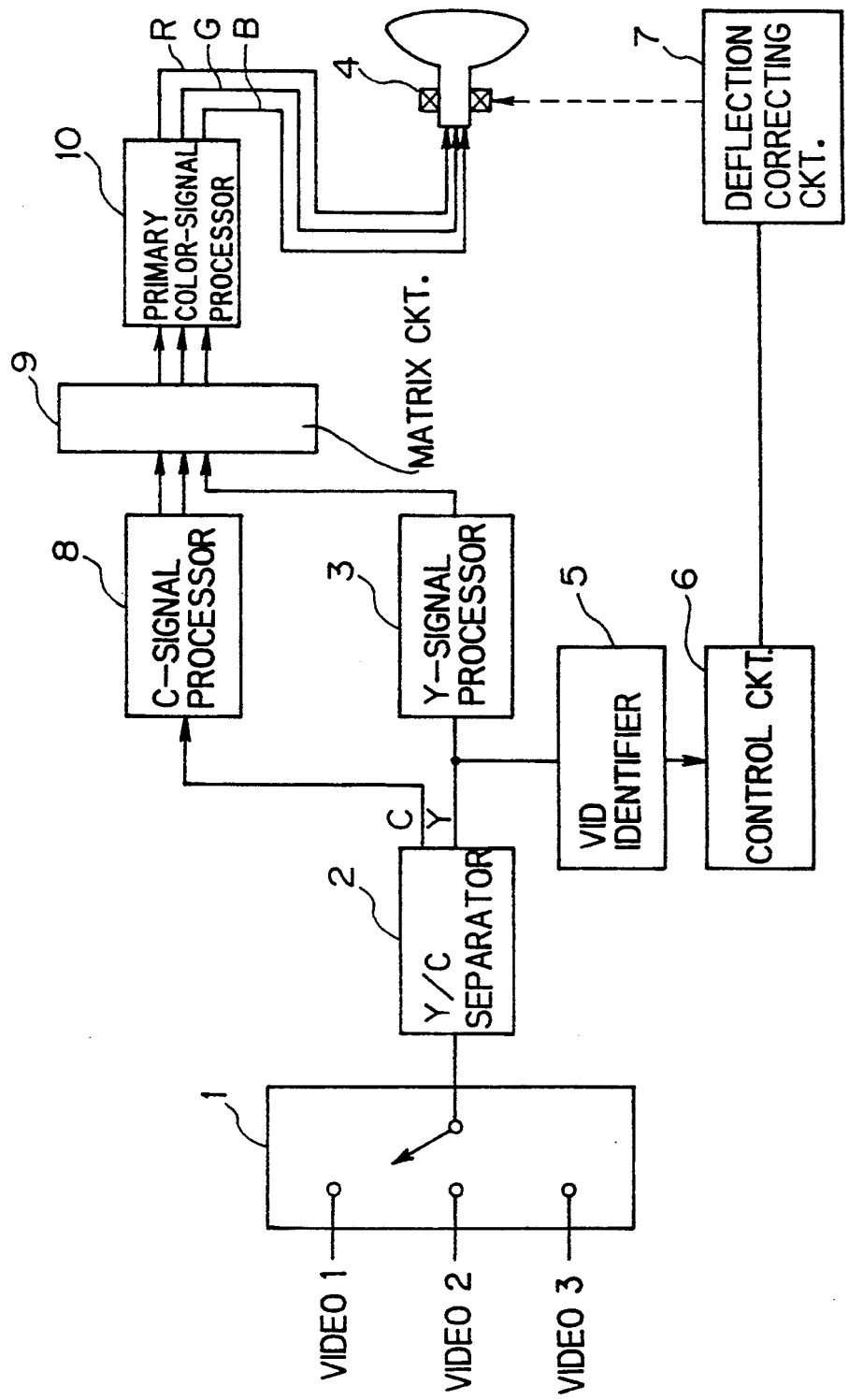
FIG. 2 is a block diagram showing the construction of an embodiment of a video additive information identifying device according to this invention.

FIG. 2 is a block diagram showing the construction of an embodiment of a video additive information identifying device of this invention. In FIG. 2, a reference numeral 1 represents a three-way input selection switch, a reference numeral 2 represents a Y/C separator, a reference numeral 3 represents a Y-signal processor, a reference numeral 4 represents a CRT display, a reference numeral 5 represents a video ID identifier, a reference numeral 6 represents a control circuit, and a reference numeral 7 represents a deflection correcting circuit.

In this embodiment, three-way video inputs such as a video 1, a video 2 and a video 3 are provided to the input selection switch 1, and any one of these inputs is selected by the input selection switch 1. Thereafter, the selected input signal is separated into a brightness signal Y and a chromaticity signal C in the Y/C separation signal 2. The chromaticity signal C is passed through a C-signal processor 8 to be subjected to a predetermined demodulation and amplification processings, and then supplied through a matrix circuit 9 and a primary color signal processor 10 to the CRT display 4. The separated brightness signal Y is passed through the Y-signal processor 3, the matrix circuit 9 and the primary color signal processor 10 to the CRT display 4, thereby displaying a desired video image.

The video ID (VID) signal to be inserted into a video signal as a video additive information comprises a component having a fundamental wave whose spectral component is ⅛ of color subcarrier $f_{sc}$ ($\approx$447 kHz), and even if it is extracted from the Y-signal after the Y/C separation processing, there occurs no significant problem in frequency characteristic. At this point, there occurs no problem even if the signal passes through a comb filter. Further, a timing signal serving as a reference signal for the identification is also extracted from the Y-signal system, and thus there occurs no erroneous identification.

The video ID identifier 5 extracts the video ID signal in the Y signal, and the content of the video ID signal is decoded to identify a frame mode of the selected input video signal. The identification result is transmitted to the control circuit 6 to control a prescribed signal processing, and the deflection correcting circuit 7 is driven to compensate a deflection system of the CRT display 4 so that a display is carried out in the identified frame mode.

According to the video additive information identifying device of this invention thus constructed, an input system for plural video signal inputs can be commonly usable without using individual identifying circuits for the signal inputs. Therefore, a mount space for circuits can be saved. In addition, the cost of the device can be reduced because the number of circuits is reduced, and a load to a power source can be also reduced.

What is claimed is:

1. A video mode information identifying device, comprising:

input selection means for selecting one of a plurality of input video signals each including a brightness signal, a chromaticity signal, and video mode information representing a display frame mode inserted in the brightness signal, said video mode information having a fundamental wave spectral component equal to ⅛ of a frequency of a color sub-carrier;

a Y/C separation circuit receiving a selected one of said plurality of input video signals from said input selection means for separating the brightness signal and the chromaticity signal from the selected video signal; and an identifying circuit for extracting the video mode information from the separated brightness signal to identify a content thereof.

2. The video mode information identifying device as claimed in claim 1 wherein the video mode information is inserted in one line at a predetermined position within a vertical blanking period of the video signal.

3. The video mode information identifying device as claimed in claim 2 further comprising video display means and control means for receiving an identification result of said identifying circuit and correcting the display frame mode on the basis of the identification result.

4. A video mode information identifying device, comprising:

input selection means for selecting one of a plurality of input video signals each including a brightness signal, a chromaticity signal, and video mode information representing a display frame mode inserted in the brightness signal, said video mode information having a fundamental wave spectral component equal to ⅛ of a frequency of a color sub-carrier;

a Y/C separation circuit receiving a selected one of said plurality of input video signals from said input selection means for separating the brightness signal and the chromaticity signal from the selected video signal;

video signal processing and video display means including a deflection system for subjecting the separated brightness signal and chromaticity signal to respective processings to display a desired video image on the video display means;

an identifying circuit for extracting the video mode information from the separated brightness signal to identify a content thereof; and deflection control means for receiving an identification result of said identifying circuit and controlling the deflection system of said video display means to correct the display frame mode on the basis of the identification result.

* * * * *